June 12, 1923.
E. C. HIXSON ET AL
HOT AIR AND STEAM COOKER
Filed Aug. 8, 1921
1,458,412
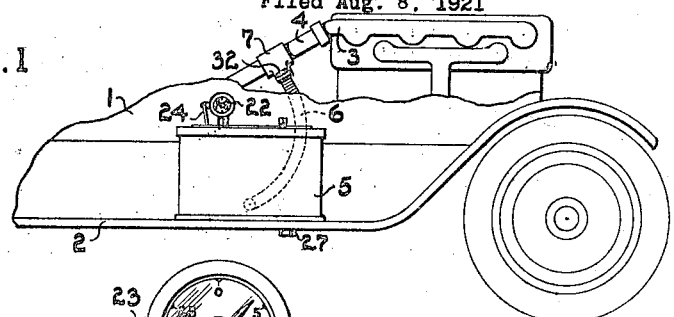
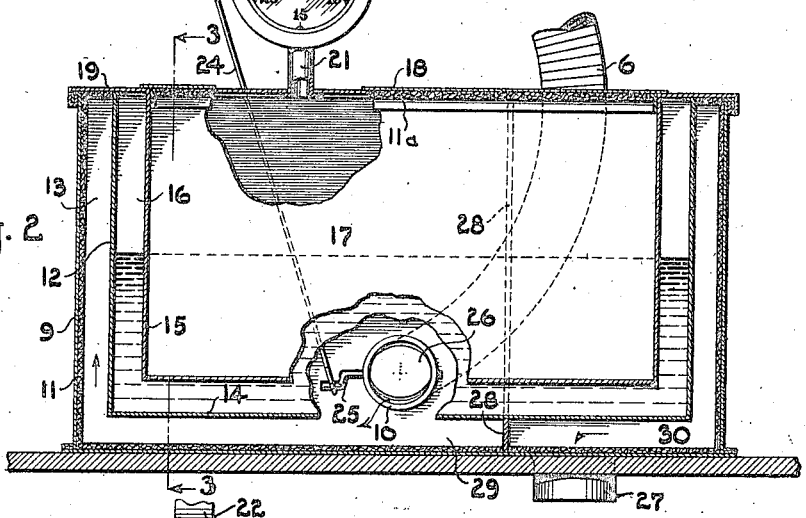
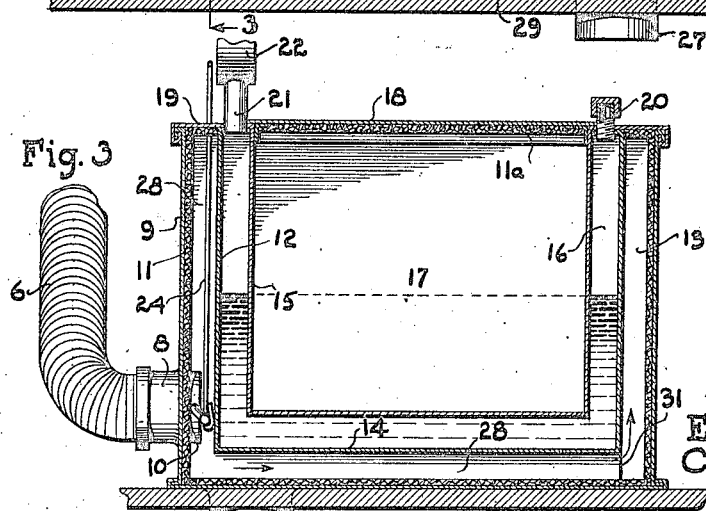
Earl C. Hixson
Charles T. Hixson
INVENTORS
WITNESSES
Frank B. Cook
Harry E. Seidel
BY
ATTORNEY Patented June 12, 1923.

1,458,412

UNITED STATES PATENT OFFICE.

EARL C. HIXSON AND CHARLES T. HIXSON, OF RINGWOOD, OKLAHOMA.

HOT-AIR AND STEAM COOKER.

Application filed August 8, 1921. Serial No. 490,621.

*To all whom it may concern:*

Be it known that we, EARL C. HIXSON and CHARLES T. HIXSON, citizens of the United States, residing at Ringwood, in the county of Major and State of Oklahoma, have invented a new and useful Hot-Air and Steam Cooker, of which the following is a specification.

This invention relates to a hot air and steam cooker, and is more particularly directed to a cooker adapted to be carried by an automobile and heated by the exhaust gases of the engine.

An object of this invention is to provide a cooker, which will cook food by means of steam generated by the hot exhaust gases of the engine, but the application of the steam will not be directly applied to the food or to the cooking utensils which contain the food, but to the casing of the cooking chamber. Furthermore, the flow of the exhaust gases is controlled by the pressure of the steam generated.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawing:—

Fig. 1 is a fragmentary view of an automobile with our improved cooker applied to the running board and connected to the exhaust pipe of the engine.

Fig. 2 is a vertical longitudinal section of the cooker.

Fig. 3 is a transverse section along the line 3—3, Fig. 2.

Referring to the drawing, 1 designates generally an automobile having a running board 2, an engine 3, and an exhaust pipe 4.

The cooker 5 is mounted upon the running board 2, and has a flexible pipe 6 connected at one end to a coupling 7, forming in this instance a part of the exhaust pipe 4, the flexible tubing 6 being connected at its other end to a nipple 8, which is securely mounted in an opening located in the back wall of the outer casing 9 of the cooker.

The nipple 8 is provided with an extension 10 which projects into the chamber within the outer casing 9. Some kind of non-conducting material 11, such as asbestos, lines the inner sides and bottom of the outer casing 9 and is extended inwardly to the sides of an intermediate casing 12, which forms with the outer casing 9 a heating chamber or hot air space 13 for the cooker.

The intermediate casing 12 is provided with side walls and a bottom 14, in which is suspended an inner casing 15, forming with the side walls and bottom of the intermediate casing 12, a water and steam chamber or space 16. The inner casing 15 forms a cooking chamber 17, which is open at its top and provided with a cover 18 which is also lined with a non-conducting material 11$^a$. A fixed top 19 closes the upper ends of the chambers 13 and 16, the inner casing 15 being secured to and suspended from the top 19.

The top 19 is provided with a threaded perforation in which is adapted to be screwed a filling plug 20. The chamber 16 is filled about half full of water through the threaded perforation in the top 19. The rear portion of the top is perforated to receive a pipe 21 of a steam gage 22, to which is connected a lever 23, controlled by the pressure of the steam in the gage to operate a link 24, connected to a crank 25 for operating the valve 26 located within the extension 10 of the nipple 8. It will be seen that the valve 26 automatically controls the flow of the exhaust gases from the engine to the heating chamber 13 of the cooker.

The flow of the exhaust gases in the heating chamber 13 is indicated by the arrows in Figs. 2 and 3. In order to prevent the exhaust gases from being delivered directly to the exit pipe 27 from the nipple 8, a baffle plate 28 is secured between the bottom 14 of the intermediate casing 12 and the bottom of the outer casing 9, and extends upwardly between the rear sides of the outer casing 9 and the intermediate casing 12, (see Fig. 2), partitioning the heating chamber in two compartments 29 and 30, so that the extension 10 or admission end of the exhaust conduit 6 will be located in one of the compartments of the heating chamber, while the exit pipe 27 will be located in the other compartment. By this arrangement, the gases are compelled to travel first in the compartment 29 beneath a portion of the bottom 14, and between the rear sides of the casings 9 and 12, respectively, and then escape by the end 31 of the lower portion of the baffle 28, which falls short of the full width of the heating chamber 13, then passing through the horizontal and vertical portions of the heating compartment 30 and escaping through the pipe 27 to the atmosphere.

It will be seen from this arrangement that the water in the water chamber is heated on all four sides and likewise at the bottom, no part of the water or steam being permitted to enter the cooking chamber.

Located in the extension of the coupling 7, where the exhaust tube 6 is connected, is a valve 32 for cutting off communication between the exhaust tube 6 and the exhaust pipe 4.

The operation of our device is as follows:—

Food is placed in cooking utensils which are then put in the cooking chamber 17, and the cover 18 is then securely fastened upon the chamber in any approved manner. The plug 20 is removed and the chamber 16 half filled with water, when the valve 32 may be opened, permitting exhaust gases from the pipe 4 to pass through the auxiliary exhaust tube 6, and enter the heating chamber 13 of the cooker, the valve 26 being then open. A continued flow of exhaust gases through the heating chamber 13 will heat the water in the water chamber and create steam.

It will be noted that the extension 10 of the nipple 8 is located adjacent to the side of the water chamber 16, so that as the exhaust gases pass from the tube 6 they will be directed against the side of the intermediate casing 12, whereby the hot exhaust gases will quickly heat the water located in the chamber 16. When sufficient steam has been created in said chamber, it will pass up through the pipe 21 into the steam gage 22 and operate the lever 23, thereby gradually closing the valve 26 to prevent any further heating of the water. As the cooker gradually cools off, the lever 23 will be retracted and the valve 26 gradually opened, so that the exhaust gases from the exhaust pipe 4 will again be admitted to the hot air chamber 13, to heat the water in the chamber 16 and create a new pressure of steam.

It will be seen that the operation of our device is entirely automatic, being controlled by the steam pressure within the chamber 16, and that no attention need be given to the cooker until the cooking of the food is completed.

What is claimed is:—

1. A cooker comprising an outer closed heating chamber adapted to be secured to the running board of an automobile and having heat insulating walls, a steam chamber depending from the top wall of the heating chamber and spaced from the sides and bottom thereof, a cooking chamber depending from the top wall of the steam chamber, the space between the sides and bottom of the cooking chamber and the sides and bottom of the steam chamber being partly filled with water and otherwise entirely unobstructed, the walls of the cooking chamber having integral flanges which form the top wall of the heating and steam chambers and a seal for the latter, a removable cover for the cooking chamber, damper-controlling means affording communication between the heating chamber and the exhaust pipe of the motor, and a pressure gage connected with the steam chamber and automatically operable to control the damper.

2. A cooker comprising an outer closed heating chamber adapted to be secured to the running board of an autotmobile and having heat insulating walls, a steam chamber depending from the top wall of the heating chamber and spaced from the sides and bottom thereof, a cooking chamber depending from the top wall of the steam chamber, the space between the sides and bottom of the cooking chamber and the sides and bottom of the steam chamber being partly filled with water and otherwise entirely unobstructed, the walls of the cooking chamber having integral flanges which form the top wall of the heating and steam chambers and a seal for the latter, a removable cover for the cooking chamber, a passageway connecting the heating chamber with the exhaust pipe of the motor, a damper in said passageway, a pressure gage connected with the steam chamber and automatically operable to control the damper, a baffle extending across the space between the bottoms of the heating and steam chambers and across the space between the sides of said chambers adjacent the inlet of said passageway, an outlet for the gases from the heating chamber through the running board adjacent the inlet of said passageway but on the opposite side of the baffle, whereby the exhaust gases from the motor will be compelled to traverse the entire length of the chamber and back again to reach the outlet.

3. A cooker comprising an outer closed heating chamber adapted to be secured to the running board of an automobile, a steam chamber depending from the top wall of the heating chamber and spaced from the sides and bottom thereof, a cooking chamber depending from the top wall of the steam chamber, the space between the sides and bottom of the cooking chamber and sides and bottom of the steam chamber being partly filled with water, the walls of the cooking chamber having integral flanges which form the top wall for the heating and steam chambers and a seal for the latter, a removable cover for the cooking chamber, a pipe leading from the exhaust manifold of the automobile motor into said heating chamber, a pressure-operated gage mounted upon and having communication with the steam chamber and having an arm oscillatable by the pressure to indicate the amount of said pressure, a lever connected to said gage, a link connected at one end to the end of the lever, a damper in said pipe mounted to oscillate about a central axis transverse to the pipe and having a laterally-extending arm connected to the other end of said link and operable by an increase of pressure to oscillate the damper toward closed position to shut off the inlet of exhaust gases to the heating chamber.

In testimony, that we claim the foregoing as our own, we have hereto affixed our signatures.

EARL C. HIXSON.
CHARLES T. HIXSON.